| United States Patent [19] | [11] 3,839,311 |
| Guillory et al. | [45] Oct. 1, 1974 |

[54] POLYMER PRO-OXIDANT COMPRISING HYDROXY-SUBSTITUTED 2,4-PENTADIENOPHENONES

[75] Inventors: Jack P. Guillory, Bartlesville, Okla.; Ronald D. Mathis, Taylors, S.C.

[73] Assignee: Phillips Petroleum Company, Bartlesville, Okla.

[22] Filed: Sept. 6, 1972

[21] Appl. No.: 286,688

[52] U.S. Cl................... 260/93.7, 47/9, 47/DIG. 7, 260/45.95 F, 260/94.8, 260/94.9 GC, 260/DIG. 43
[51] Int. Cl. ............................................... C08f 3/02
[58] Field of Search ........... 260/45.95 F, 93.7, 94.8, 260/94.9 GC, DIG. 43; 47/9, DIG. 7

[56] References Cited
UNITED STATES PATENTS
3,454,510   7/1969   Newland et al. ............ 260/94.9 GC

*Primary Examiner*—Melvyn I. Marquis

[57] ABSTRACT

The use of hydroxy-substituted 2,4-pentadienophenones as pro-oxidants for polymeric compositions is described. The pro-oxidants can be advantageously employed in polypropylene compositions comprising about 0.02 to 5 parts of pro-oxidant per 100 parts by weight of polypropylene.

8 Claims, No Drawings

POLYMER PRO-OXIDANT COMPRISING HYDROXY-SUBSTITUTED 2,4-PENTADIENOPHENONES

This invention relates to the use of pro-oxidants to induce ultraviolet light degradation of polymeric compositions, and polymeric compositions containing pro-oxidants which are readily degraded when exposed to ultraviolet light irradiation.

Various polymeric materials are preferably employed because of their safety features as nonbreakable plastic containers for suntan lotions, oils, cremes, etc., by the general public at recreation areas during the summer season. In general, conventional polymeric compositions contain ultraviolet light stabilizing additives which retard the degradation of polymeric materials in the presence of ultraviolet light. The widespread use of essentially unbreakable, nondegradable containers by the general public at beach resort areas coupled with careless littering of the areas after using the contents of the polymeric containers has created an environmental contamination waste disposal problem of proportions which are economically, socially, and aesthetically undesirable. In order to retain the safety features of nonbreakable plastic containers and, additionally, provide a composition which rapidly degrades in the presence of ultraviolet light, the search for and identification of polymeric additives and compositions which rapidly degrade in the presence of ultraviolet light was undertaken.

It is an object of this invention to provide pro-oxidants which rapidly promote degradation of polymeric materials in the presence of ultraviolet light. Another object is to provide polymeric materials which are suitable for the manufacture of initially essentially nonbreakable containers which readily degrade after exposure to ultraviolet light. Other objects of the invention will be readily apparent from the description and the appended claims.

In accordance with this invention, we have discovered novel prooxidants for polymeric materials, and novel polymeric compositions containing pro-oxidants.

The pro-oxidant additives that can be employed in the practice of this invention are hydroxy-substituted pentadienophenones. These additives can be represented by the following formula

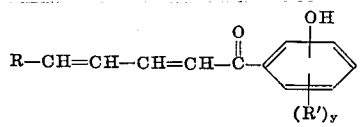

wherein R represents an acyclic radical having up to 20 carbon atoms or a cyclic radical having up to 20 carbon atoms, each R' independently represents halogens, an acyclic radical having up to 20 carbon atoms or a cyclic radical having up to 20 carbon atoms, and y is an integer having a value of from 0 to 4. Particularly preferred acyclic and cyclic radicals are aliphatic, alicyclic, aromatic hydrocarbyl or hydrocarbyloxy radicals and combinations thereof, having up to 10 carbon atoms. Presently preferred hydroxy-substituted pentadienophenones have the hydroxyl substituent in the 2-position relative to the carbonyl group of the pentadienophenone.

Illustrative of specific hydroxy-substituted pentadienophenone compounds that can be employed are 2'-hydroxy-5-phenyl-2,4-pentadienophenone, 2-cinnamylideneacetyl-1-naphthol, 2'-hydroxy-5-cyclohexyl-2,4-pentadienophenone, 2'-hydroxy-4'-chloro-5-phenyl-2,4-pentadienophenone, 2'-hydroxy-2,4-pentadienophenone, 2'-hydroxy-5-methoxy-2,4-pentadieneophenone, 2'-hydroxy-5-(p-butoxyphenyl)-2,4-pentadienophenone, 2'-hydroxy-2,4-hexadienophenone, 2'-hydroxy-2,4-pentacosadienophenone, 2'-hydroxy-3',4'-dimethoxy-5-phenyl-2,4-pentadienophenone, and the like and combinations thereof.

Suitable methods for preparing hydroxy-substituted pentadienophenones are described in Cheema, Gulati and Venkataraman, J. Chem. Soc. 1932, 925-33.

The proportions of the pro-oxidant employed in the practice of this invention can vary widely. Preferably, on a weight basis, based on 100 parts of polymer, the pro-oxidant is present in an amount of from about 0.02 to about 5 parts and more preferably from about 0.1 to about 2 parts. In general, the pro-oxidant efficacy increases in direct proportion to the quantity of pro-oxidant present in the polymer composition.

In the practice of this invention any polymer subject to free radical attack can be employed. Particularly useful polymers are homopolymers and copolymers derived from the polymerization of monomeric materials having ethylenic unsaturation. Particularly advantageously employed polymers are homopolymers and/or copolymers derived from the polymerization of 1-monoolefins having from 2 to 8 carbon atoms. In most instances, the presently preferred polymers are ethylene or propylene homopolymers, or copolymers of ethylene or propylene with minor amounts of other monomers copolymerizable therewith such as propylene or ethylene, butene-1, hexene-1, octene-1, and the like. Polymers wherein at least 50 mol percent of the polymer is derived from the polymerization of ethylene or propylene monomeric units are advantageously employed. Of even more importance are polymeric materials wherein at least 90 mol percent of the polymer is derived from ethylene or propylene monomer units and from about 0.5 to 10 mol percent of another comonomer unit selected from ethylene, propylene, butene-1, pentene-1 or hexene-1.

In addition to the polymer and the pro-oxidant employed in the practice of this invention, other additives can be included in the polymer compositions. The pro-oxidants can be admixed with the polymers by any suitable method known to the art for incorporating such additives or additive combinations into polymeric materials. For example, the pro-oxidants can be incorporated into polymers by dry blending with polymer powders or pellets in tumble mixers, Henschel mixers and the like. Optionally, the pro-oxidants and polymer can be admixed in screw extruders, Banbury mixers, Brabender mixers, roll mills, etc., to blend the pro-oxidants with a polymeric material at the polymer softening or melt temperature. Optionally, the pro-oxidants can be sprayed on the polymer powder from a solution or dispersion such as acetone, methanol, cyclohexane, benzene and the like prior to pelletizing the polymeric composition containing a pro-oxidant. When a solvent is employed for the application of a pro-oxidant it is generally removed by evaporation prior to pelletizing the polymeric composition.

In addition, conventional additives such as fillers, pigments, plasticizers, thermal stabilizers, antioxidants, lubricating and processing additives can be incorporated, if desired, into the polymeric compositions for purposes well known to the art.

Set out hereafter is an example in further illustration of the invention, but which should not be construed in undue limitation thereof.

EXAMPLE

A polypropylene composition containing the pro-oxidant additive 2'-hydroxy-5-phenyl-2,4-pentadienophenone, designated hereinafter as A, and a polypropylene composition void of said pro-oxidant, hereinafter designated as B were compounded and prepared for testing in accordance with the procedure set out hereafter. In each case the polymeric compositions A and B employed the same polypropylene which had a nominal melt flow of 3. The polymer compositions A and B were both formed into films having a thickness of 5 mils. The films were tested in an Atlas Twin Enclosed Carbon Arc Weather-O-Meter in which exposure to radiation was at an angle of about 90°, said Weather-O-Meter having been modified by disconnecting the water spray cycle and adding 8–20 watt Westinghouse fluorescent sun lamps according to the procedure described in *Analytical Chem*, 25, 460 (1953). Film samples A and B were tested for failure every 20 hours by subjecting each film strip to a rolling motion such that the entire length of the film strip was bent approximately 180°. The samples failed when the film strips broke. Each polypropylene polymer film sample A and B contained equal quantities of a conventional antioxidant normally employed to thermally stabilize polypropylene formulations. The results of the tests were as follows:

| Polypropylene Composition | Pro-oxidant Amount php* | Hours to Failure |
|---|---|---|
| "A" | 0.5 | 40 |
| "B" | 0.0 | 67 |

*Parts of pro-oxidant by weight per 100 parts of polypropylene by weight.

As indicated by the above date, it is readily apparent that the polymeric composition A containing the pro-oxidant exhibits a greater degree of instability in the presence of ultraviolet light than polymeric composition B void of a pro-oxidant additive material.

In the above pro-oxidant example, evaluation 0.05 php of a conventional polypropylene antioxidant, i.e., octadecyl[3-(3,5-di-t-butyl-4-hydroxyphenyl)]-propionate, was included in both A and B compositions. Although an anti-oxidant was contained in both of the A and B compositions the inclusion of said anti-oxidants therein was for the purpose of stabilizing the polymer against oxidative degradation primarily during the extrusion of the blend and not for the purpose of facilitating the operability or efficacy of the pro-oxidant additives of this invention. Any conventional polymer antioxidant can be employed in the practice of this invention. Representative of readily available commercial antioxidants that are suitable are tetrakis[methylene(3,5-di-t-butyl-4-hydroxyhydrocinnamate)]methane, 2,6-di-t-butyl-4-methylphenol, di-n-octadecyl-(3,5-di-t-butyl-4-hydroxybenzyl)phosphonate and the like.

Persons skilled in the art will recognize that by varying the relative amounts of pro-oxidant and thermal stabilizers incorporated in the polymeric compositions that the time to failure can be regulated. Such times can be determined by routine experimentation.

Further modifications of the teachings of this invention by the use of pro-oxidants belonging to the class consisting of hydroxy-substituted pentadieno-phenones to impart ultraviolet instability to polymeric materials will be apparent to those skilled in the art.

We claim:

1. A polymeric composition comprising a polymeric material subject to free radical attack and a hydroxy-substituted pentadienophenone represented by the formula

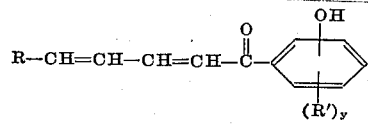

wherein R represents an acyclic radical or a cyclic radical, each R' independently represents halogen, an acyclic radical, or a cyclic radical, and y is an integer having a value of from 0 to 4.

2. A polymeric composition in accordance with claim 1 wherein said acyclic and cyclic radicals are independently selected from aliphatic, alicyclic, aromatic hydrocarbyl or hydrocarbyloxy radicals and combinations thereof having up to 10 carbon atoms.

3. A polymeric composition in accordance with claim 2 wherein said hydroxy-substituted pentadienophenone is 2'-hydroxy-5-phenyl-2,4-pentadienophenone.

4. A polymeric composition in accordance with claim 1 wherein said polymeric material is a polyolefin.

5. A polymeric composition in accordance with claim 4 wherein said hydroxy-substituted pentadienophenone is incorporated in said polyolefin in an amount of from about 0.02 to about 5 parts by weight per 100 parts by weight of said polyolefin.

6. A polymeric composition in accordance with claim 5 wherein said hydroxy-substituted pentadienophenone is 2'-hydroxy-5-phenyl-2,4-pentadienophenone.

7. A polymeric composition in accordance with claim 6 wherein said polyolefin is derived from the polymerization of 1-monoolefins having from 2 to 8 carbon atoms.

8. A polymeric composition in accordance with claim 7 wherein at least 90 mol percent of the polyolefin is derived from the polymerization of propylene and from about 0.5 to about 10 mol percent of the polyolefin is derived from the polymerization of a comonomer selected from the group consisting of ethylene, butene-1, pentene-1, and hexene-1.

* * * * *